US010400869B2

(12) United States Patent
Sato et al.

(10) Patent No.: US 10,400,869 B2
(45) Date of Patent: Sep. 3, 2019

(54) CHAIN DRIVE MECHANISM

(71) Applicant: TSUBAKIMOTO CHAIN CO., Osaka-shi, Osaka (JP)

(72) Inventors: Toshifumi Sato, Osaka (JP); Takeo Sasaki, Osaka (JP); Kosuke Fujishima, Osaka (JP)

(73) Assignee: TSUBAKIMOTO CHAIN CO., Osaka-shi (JP)

( * ) Notice: Subject to any disclaimer, the term of this patent is extended or adjusted under 35 U.S.C. 154(b) by 218 days.

(21) Appl. No.: 15/677,331

(22) Filed: Aug. 15, 2017

(65) Prior Publication Data

US 2018/0066731 A1 Mar. 8, 2018

(30) Foreign Application Priority Data

Sep. 2, 2016 (JP) ................................ 2016-171620

(51) Int. Cl.
*F16H 7/06* (2006.01)
*F16G 13/04* (2006.01)
*F16H 55/30* (2006.01)

(52) U.S. Cl.
CPC .............. *F16H 7/06* (2013.01); *F16G 13/04* (2013.01); *F16H 55/30* (2013.01)

(58) Field of Classification Search
CPC . F16G 13/04; F16H 55/30; F16H 7/06; F16H 2055/306; F16H 7/023
USPC .......................................................... 474/148
See application file for complete search history.

(56) References Cited

U.S. PATENT DOCUMENTS 3,313,166 A * 4/1967 Elster ........................ F16G 1/28 474/148
4,041,789 A * 8/1977 Hoback ..................... F16G 1/28 474/148
4,047,444 A * 9/1977 Jeffrey .................... F16H 7/023 474/148

(Continued)

FOREIGN PATENT DOCUMENTS

JP 2000-266131 A 9/2000
JP 2002-250406 A 9/2002

(Continued)

*Primary Examiner* — Henry Y Liu
(74) *Attorney, Agent, or Firm* — Westerman, Hattori, Daniels & Adrian, LLP

(57) ABSTRACT

A simple-structured, easy-to-produce chain drive mechanism is provided, which can reduce the overall noise level irrespective of chain length or rpm, while suppressing noise and vibration caused by tension fluctuations and maintaining durability and service life. The engagement/seating mode between a silent chain and a driving sprocket is one of inside-flank engagement/inside-flank seating, inside-flank engagement/outside-flank seating, outside-flank engagement/inside-flank seating, and outside-flank engagement/outside-flank seating. The engagement/seating mode between the silent chain and a driven sprocket is one of inside-flank engagement/inside-flank seating, inside-flank engagement/outside-flank seating, outside-flank engagement/inside-flank seating, and outside-flank engagement/outside-flank seating. The engagement/seating mode between the chain and the driving sprocket is different from that between the chain and the driven sprocket.

7 Claims, 2 Drawing Sheets

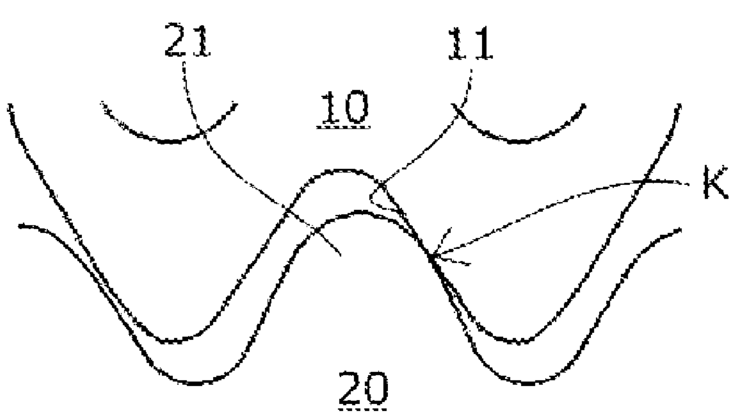

(56) References Cited

U.S. PATENT DOCUMENTS

| | | | | | |
|---|---|---|---|---|---|
| 4,147,069 | A * | 4/1979 | Derner | F16G 1/28 | 474/204 |
| 4,168,634 | A * | 9/1979 | Griffel | F16H 55/30 | 474/148 |
| 5,358,453 | A * | 10/1994 | Kimura | F16G 5/20 | 474/153 |
| 5,662,541 | A * | 9/1997 | Roovers | F16G 1/28 | 474/149 |
| 5,984,816 | A * | 11/1999 | Nishio | F16H 7/023 | 474/153 |
| 6,485,384 | B1 * | 11/2002 | Ochiai | B41J 19/005 | 474/153 |
| 7,094,170 | B2 * | 8/2006 | Young | F16G 13/04 | 474/153 |
| 7,210,573 | B2 * | 5/2007 | Mol | B65G 15/42 | 198/847 |
| 7,850,562 | B2 * | 12/2010 | DeGroot | B65G 15/26 | 474/153 |
| 7,901,312 | B2 * | 3/2011 | Ogo | F16H 55/30 | 474/212 |
| 8,057,341 | B2 * | 11/2011 | Penner | F16G 13/04 | 474/206 |
| 8,083,624 | B2 * | 12/2011 | Young | F16H 7/06 | 474/100 |
| 8,529,389 | B2 * | 9/2013 | Young | F16G 13/04 | 474/157 |
| 8,668,609 | B2 * | 3/2014 | Young | F16G 13/04 | 474/155 |
| 8,888,632 | B2 * | 11/2014 | Yasuta | F16G 13/04 | 474/206 |
| 2005/0277507 | A1 * | 12/2005 | Ogo | F16G 13/04 | 474/206 |
| 2007/0111835 | A1 * | 5/2007 | Ogo | F16G 13/04 | 474/213 |
| 2007/0155564 | A1 * | 7/2007 | Ledvina | F16G 13/04 | 474/215 |
| 2008/0167151 | A1 * | 7/2008 | Yonehara | F16G 13/04 | 474/212 |
| 2008/0300079 | A1 * | 12/2008 | Botez | F16G 13/04 | 474/213 |
| 2008/0312017 | A1 * | 12/2008 | Young | F16H 7/06 | 474/148 |
| 2008/0312019 | A1 * | 12/2008 | Ogo | F16H 55/08 | 474/212 |
| 2009/0062051 | A1 * | 3/2009 | Ogo | F16G 13/04 | 474/213 |
| 2009/0131209 | A1 * | 5/2009 | Morimoto | F16G 13/04 | 474/228 |
| 2009/0143179 | A1 * | 6/2009 | Penner | F16G 13/04 | 474/157 |
| 2010/0069187 | A1 * | 3/2010 | Young | F16G 13/04 | 474/157 |
| 2010/0069188 | A1 * | 3/2010 | Adachi | B62D 55/096 | 474/213 |
| 2010/0222170 | A1 * | 9/2010 | Yasuta | F16G 13/04 | 474/140 |
| 2011/0021299 | A1 * | 1/2011 | Young | F16G 13/04 | 474/157 |
| 2011/0183799 | A1 * | 7/2011 | Young | F16G 13/04 | 474/148 |
| 2011/0245002 | A1 * | 10/2011 | Young | F16H 7/06 | 474/157 |
| 2012/0196712 | A1 * | 8/2012 | Miyanaga | F16G 13/04 | 474/213 |
| 2013/0059691 | A1 * | 3/2013 | Miyanaga | F16G 13/04 | 474/214 |
| 2014/0200106 | A1 * | 7/2014 | Young | F16G 13/04 | 474/148 |
| 2015/0018150 | A1 * | 1/2015 | Cowen | F16H 57/0431 | 474/152 |
| 2015/0141183 | A1 * | 5/2015 | Cowen | F16H 7/06 | 474/157 |
| 2015/0159732 | A1 * | 6/2015 | Dietrich | F16G 13/04 | 474/156 |
| 2015/0240914 | A1 * | 8/2015 | Kurono | F16G 13/04 | 474/230 |
| 2015/0308541 | A1 * | 10/2015 | Botez | F16H 7/06 | 474/157 |

FOREIGN PATENT DOCUMENTS

| | | |
|---|---|---|
| JP | 2008-138789 A | 6/2008 |
| JP | 2009-127648 A | 6/2009 |

* cited by examiner

FIG. 1A

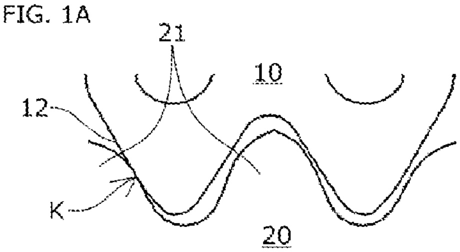

FIG. 1B

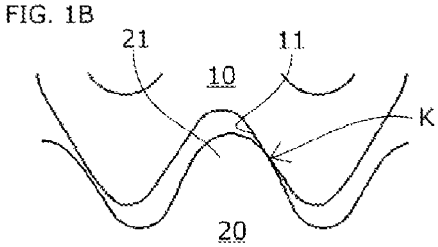

FIG. 2A

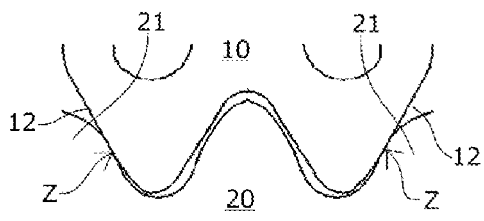

FIG. 2B

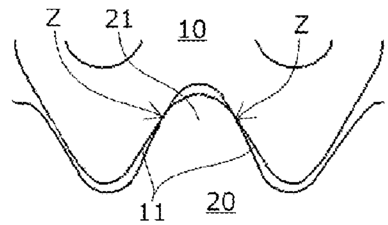

FIG. 3

| | ENGAGEMENT WITH SPROCKET | | ROTATING FATIGUE STRENGTH | NV |
|---|---|---|---|---|
| | DRIVEN SPROCKET | DRIVING SPROCKET | | |
| S1 | INSIDE-FLANK ENGAGEMENT /INSIDE-FLANK SEATING | INSIDE-FLANK ENGAGEMENT /INSIDE-FLANK SEATING | × | ◎ |
| S2 | INSIDE-FLANK ENGAGEMENT /OUTSIDE-FLANK SEATING | INSIDE-FLANK ENGAGEMENT /OUTSIDE-FLANK SEATING | ○ | ○ |
| S3 | OUTSIDE-FLANK ENGAGEMENT /OUTSIDE-FLANK SEATING | OUTSIDE-FLANK ENGAGEMENT /OUTSIDE-FLANK SEATING | ◎ | × |
| 1 | INSIDE-FLANK ENGAGEMENT /INSIDE-FLANK SEATING | INSIDE-FLANK ENGAGEMENT /OUTSIDE-FLANK SEATING | ○ | ◎ |
| 2 | INSIDE-FLANK ENGAGEMENT /INSIDE-FLANK SEATING | OUTSIDE-FLANK ENGAGEMENT /OUTSIDE-FLANK SEATING | ○ | ◎ |
| 3 | INSIDE-FLANK ENGAGEMENT /OUTSIDE-FLANK SEATING | OUTSIDE-FLANK ENGAGEMENT /OUTSIDE-FLANK SEATING | ◎ | ◎ |

FIG. 4

| | ENGAGEMENT WITH SPROCKET | | ROTATING FATIGUE STRENGTH | NV |
|---|---|---|---|---|
| | SMALLER NO. OF TEETH | LARGER NO. OF TEETH | | |
| S4 | INSIDE-FLANK ENGAGEMENT /INSIDE-FLANK SEATING | INSIDE-FLANK ENGAGEMENT /OUTSIDE-FLANK SEATING | △ | ◎ |
| S5 | INSIDE-FLANK ENGAGEMENT /INSIDE-FLANK SEATING | OUTSIDE-FLANK ENGAGEMENT /OUTSIDE-FLANK SEATING | △ | ◎ |
| 4 | INSIDE-FLANK ENGAGEMENT /OUTSIDE-FLANK SEATING | OUTSIDE-FLANK ENGAGEMENT /OUTSIDE-FLANK SEATING | ○ | ◎ |
| 5 | INSIDE-FLANK ENGAGEMENT /OUTSIDE-FLANK SEATING | INSIDE-FLANK ENGAGEMENT /INSIDE-FLANK SEATING | ○ | ◎ |
| 6 | OUTSIDE-FLANK ENGAGEMENT /OUTSIDE-FLANK SEATING | INSIDE-FLANK ENGAGEMENT /INSIDE-FLANK SEATING | ◎ | ◎ |
| 7 | OUTSIDE-FLANK ENGAGEMENT /OUTSIDE-FLANK SEATING | INSIDE-FLANK ENGAGEMENT /OUTSIDE-FLANK SEATING | ◎ | ◎ |

CHAIN DRIVE MECHANISM

BACKGROUND OF THE INVENTION

1. Field of the Invention

The present invention relates to a chain drive mechanism that includes a driving sprocket, a driven sprocket, and a silent chain passed over the driving sprocket and driven sprocket.

2. Description of the Related Art

Chain drive mechanisms that use a driving sprocket, a driven sprocket, and a silent chain passed over the driving sprocket and driven sprocket are known and have found use in wide applications such as power transmission, synchronized rotation, and changing of rpm or torque.

Generally, a silent chain is made of up a large number of link plates each having a pair of teeth and a pair of pin holes, these link plates being pivotally coupled with connecting pins inserted in the pin holes. The endless silent chain is passed over a plurality of sprockets in the chain drive mechanism, the teeth of the link plates meshing with the teeth of the sprockets, so as to transmit rotation.

In such a chain drive mechanism, when each link plate moves onto a sprocket frost the free span of the silent chain, teeth of each link plate first abut the teeth of the sprocket when mating with them, and as the silent chain passes around the sprocket and bends, the links seat on the teeth of the sprocket. All of the link plates repeat these actions in cycles at high speed during the rotation, and ways to reduce the noise generated by these engaging and seating actions are being sought after.

In known chain drive mechanisms disclosed in Japanese Patent Application Laid-open Nos. 2000-266131 and 2002-250406, and the like, link plates of varying pair-teeth pitches are randomly arranged in the silent chain so as to make the timing of engagement/seating irregular to reduce the noise.

In a known chain drive mechanism disclosed in Japanese Patent Application Laid-open No. 2008-138789 and the like, link plates with varying spring constants at the onset of meshing with the sprocket teeth are randomly arranged so as to make the impact of engagement irregular to reduce the noise.

In a known chain drive mechanism disclosed in Japanese Patent Application Laid-open No. 2009-127648 and the like, the connecting pins of the silent chain are of the type that combines a rocker pin and a joint pin, and rocker pins and joint pins with different thicknesses are randomly arranged so as to make the timing of engagement/seating irregular to reduce the noise.

SUMMARY OF THE INVENTION

While these known chain drive mechanisms can reduce the noise generated by engagement with and seating on the sprocket teeth, one issue was that the number of assembling steps of the silent chain is increased because of a larger number of components, since it is necessary to prepare link plates or connecting pins of different shapes, and to assemble the randomly arranged components.

Since there are only a limited number of link plates or connecting pins, the same pattern occurs in each cycle of the chain. The random arrangement effective for noise reduction differs case by case, and it may be that,, depending on the chain length and rpm, no large effect is achieved. It was therefore necessary to change the arrangement in accordance with the specifications of the chain drive mechanism to which it is applied.

When the chain is passed over a plurality of sprockets, noise of the same pattern is generated in each sprocket. Therefore, sometimes, even when noise was reduced in discrete sprockets, the overall noise of the entire chain drive, mechanism was not reduced.

There was also a worry that, depending on the chain length and rpm, noise or vibration could increase because of tension fluctuations caused by the irregular timing of engagement/seating. For chain drive mechanisms configured for large torque transmission, in particular, there was a worry that the durability and service life could be adversely affected.

The present invention solves these problems and it is an object of the invention to provide a simple-structured, easy-to-produce chain drive mechanism that, can reduce the overall noise level irrespective of chain length or rpm while minimizing noise and vibration caused by tension fluctuations and maintaining durability and service life.

To solve the problems above, the chain drive mechanism according to the present invention includes a driving sprocket, a driven sprocket, and a silent chain passed over the driving sprocket and the driven sprocket, wherein the silent chain and the driving sprocket are in an engagement/seating mode that is one of inside-flank engagement/inside-flank seating, inside-flank engagement/outside-flank seating outside-flank engagement/inside-flank seating, and outside-flank engagement/outside-flank seating, and the silent chain and the driven sprocket are in an engagement/seating mode that, is one of inside-flank engagement/inside-flank seating, inside-flank engagement/outside-flank sea ting outside-flank engagement/inside-flank seating, and outside-flank engagement/outside-flank seating. The engagement/seating mode between the silent chain and the driving sprocket is different from that between the chain and the driven sprocket.

With the chain drive mechanism according to claim 1, the engagement/seating mode between the chain and the driving sprocket is different from that between the chain and the driven sprocket. The timing of engagement/seating of the silent chain in each sprocket and the level and frequency of the sound generated differ irrespective of the chain length and rpm, so that the overall noise of the chain drive mechanism can be reduced.

The engagement/seating mode of the silent chain can be differed only by changing the shapes of the sprocket teeth and there is no need to use link plates or connecting pins of different shapes for the silent chain. Also, there is no need to change the design of the silent chain in accordance with the specifications of the chain drive mechanism to which it is applied. Thus production work and cost can be reduced.

Since the irregular engagement and seating do not cause tension fluctuations, fluctuation-induced noise or vibration is hardly generated, so that the durability and service life will not be adversely affected.

According to the configuration set forth in claim 2, a dimensional difference between a pitch circle radius of the driving sprocket teeth and a standard pitch circle radius, and a dimensional difference between a pitch circle radius of the driven sprocket teeth and the standard pitch circle radius, are made different from, each other. The engagement/seating mode can be readily differed without changing the silent chain, by adjusting the production specifications of the sprockets with a simple operation such as changing the cutting depth of the tool, for example. Thus the overall production work and cost of the chain drive mechanism can be reduced.

According to the configuration set forth in claim 3, the driving sprocket teeth and the driven sprocket teeth, which the silent chain engages with and seats on, have faces formed at different angles. The engagement/seating mode can be readily differed without changing the silent chain, only by adjusting the production specifications of the sprockets. Thus the overall production work and cost of the chain drive mechanism can be reduced.

According to the configuration set forth in claim the driving sprocket and the driven sprocket have the same number of teeth. The engagement mode between the silent chain and one of the driving sprocket and driven sprocket is inside-flank engagement, and the seating mode between the silent chain and the other of the driving sprocket and driven sprocket is outside-flank seating. When sprockets having the same number of teeth are used, generation of fluctuation-induced noise or vibration is minimized without deteriorating the rotation fatigue strength, and thereby maintaining the durability and service life, so that the overall noise can be reduced.

According to the configuration set forth in claim 5, the seating mode between the silent chain and the driving sprocket and driven sprocket is outside-flank seating. When sprockets having the same number of teeth are used, the rotation fatigue strength is increased so that the durability can be improved and service life extended.

According to the configuration set forth in claim 6, one of the driving sprocket and driven sprocket has a larger number of teeth than the other one of the sprockets, and the seating mode between the silent chain and the other of the driving sprocket, and driven sprocket is outside-flank seating. When sprockets having different numbers of teeth are used, generation of fluctuation-induced noise or vibration is minimized without deteriorating the rotation fatigue strength, and thereby maintaining the durability and service life, so that the overall noise can be reduced.

According to the configuration set forth in claim 7, the engagement/seating mode between the silent chain and the other of the driving sprocket and driven sprocket is outside-flank engagement/outside-flank seating. When sprockets having different numbers of teeth are used, the rotation fatigue strength is increased so that the durability can be improved and service life extended.

BRIEF DESCRIPTION OF THE DRAWINGS

FIG. 1A and FIG. 1B are illustrative diagrams of engagement modes between a silent chain and a sprocket;

FIG. 2A and FIG. 2B are illustrative diagrams of seating modes of the silent chain on the sprocket;

FIG. 3 is an evaluation table of rotating fatigue strength and noise level in relation to the engagement/seating modes when the numbers of the teeth are the same; and FIG. 4 is an evaluation table of rotating fatigue strength and noise level in relation to the engagement/seating modes when the numbers of the teeth are different.

DESCRIPTION OF THE PREFERRED EMBODIMENTS

The chain drive mechanism according to the present invention may have any concrete configuration as long as it includes: a driving sprocket, a driven sprocket, and a silent, chain passed over the driving sprocket and the driven sprocket, wherein the silent chain and the driving sprocket are in an engagement/seating mode that is one of inside-flank engagement/inside-flank seating, inside-flank engagement/outside-flank seating, outside-flank engagement/inside-flank seating, and outside-flank engagement/outside-flank seating; the silent chain and the driven sprocket are in an engagement/seating mode that is one of Inside-flank engagement/inside-flank seating, inside-flank engagement/outside-flank seating, outside-flank engagement/inside-flank seating, and outside-flank engagement/outside-flank seating; and the engagement/seating mode between the chain and the driving sprocket is different from that, between the chain and the driven sprocket, so that it is a simple-structured, easy-to-produce chain drive mechanism that can reduce the overall noise level irrespective of chain length or rpm while minimizing noise and vibration caused by tension fluctuations and maintaining durability and service life.

In a chain drive mechanism that has a silent chain, there are two modes of engagement when the silent chain moves into contact with the sprocket: One is outside-flank engagement where an outside flank 12 of a link plate 10 first abuts on a tooth 21 of the sprocket 20 at a meshing point K as shown in FIG. 1A, and the other is inside-flank engagement where an inside flank 11 of the link plate 10 first abuts on the tooth 21 of the sprocket 20 at a meshing point K as shown in FIG. 1B.

There are also two seating modes when the silent chain is wrapped around the sprocket: One is outside-flank seating where outside flanks 12 of a link plate 10 seat on teeth 21 of the sprocket 20 at a seating point 2 as shown in FIG. 2A, and the other is inside-flank seating where the inside flank 11 of the link plate 10 seats on a tooth 21 of the sprocket 20 at a seating point 2 as shown in FIG. 2B.

Namely, there are four engagement/seating mode combinations when the silent chain is wrapped around the sprocket: Inside-flank engagement/inside-flank seating, inside-flank engagement/outside-flank seating, outside-flank engagement/inside-flank seating, and outside-flank engagement/outside-flank seating.

Generally, inside-flank engagement is beneficial for noise reduction but unfavorable in respect of rotating fatigue strength that affects durability and service life as compared to outside-flank engagement. Inside-flank seating is beneficial for noise reduction but unfavorable in respect of rotating fatigue strength as compared to outside-flank seating.

Stability is lower in inside-flank seating than in outside-flank seating, and therefore unfavorable for vibration reduction.

It is therefore a common practice to adopt the inside-flank engagement/outside-flank seating mode in conventional chain drive mechanisms designed such that the engagement/seating modes are the same with both driving sprockets and driven sprockets. Specifically, when the transmitted power is small and a decrease of rotating fatigue strength is not an issue, the inside-flank engagement/inside-flank seating mode is adopted to reduce noise, while, when the rotating fatigue strength needs to be high for large power transmission, the outside-flank engagement/outside-flank seating is adopted and noise increase is tolerated.

According to the chain drive mechanism of the present invention, the engagement/seating mode between the chain and a driving sprocket is differed from that between the chain and a driven sprocket, so as to reduce overall noise irrespective of the chain length or rpm, while generation of noise or vibration caused by tension fluctuations is minimized and durability and service life are maintained.

EXAMPLE

Rotating fatigue strength and noise level (NV) in various modes of engagement and seating will be explained below.

When a driving sprocket and a driven sprocket have the same number of teeth and the same tooth profile, the driving sprocket and driven sprocket will have the same engagement and seating mode.

For example, provided that the rotating fatigue strength and NV with the commonly-adopted inside-flank engagement/outside-flank seating type as shown in the example S2 of FIG. 3 are passable for practical use, the noise level is reduced in the inside-flank engagement/inside-flank seating type as shown in the example S1 because the load on the teeth is reduced. On the other hand, the rotating fatigue strength is so low, because the weakest part of the plate abuts on the sprocket teeth, that problems will arise in actual use.

Contrarily, in the out side-flank engagement/outside-flank seating type as shown in the example S3, while the rotating fatigue strength is increased, the noise level is high and problematic in actual practice.

According to the present invention, while the driving sprocket and driven sprocket have the same number of teeth, they have different tooth profiles, so that the engagement/seating mods will differ between the driving-sprocket and the driven sprocket.

Sprockets of different engagement/seating modes can be fabricated by the same production apparatus, for example, by differing the cutting depth during production.

Alternatively, the pressure angle of the sprockets may be made different.

When the driven sprocket is the inside-flank engagement/inside-flank seating type while the driving sprocket is the inside-flank engagement/outside-flank seating type, as shown in 1 in FIG. 3, the noise level is reduced while the rotating fatigue strength is kept sufficient for actual use.

When the driven sprocket is the inside-flank engagement/inside-flank seating type while the driving sprocket is the outside-flank engagement/outside-flank seating type, as shown in 2 in FIG. 3, similarly to 1, the noise level is reduced while the rotating fatigue strength is kept sufficient for practical use.

When the driven sprocket is the inside-flank engagement/outside-flank seating type while the driving sprocket is the outside-flank engagement/outside-flank seating type, as shown in 3 in FIG. 3, the rotating fatigue strength is increased, and the noise level is reduced.

In these examples of embodiment, the noise level is lowest with Example 1, when the driven sprocket is the inside-flank engagement/inside-flank seating type while the driving sprocket is the inside-flank engagement/outside-flank seating type, while the rotating fatigue strength is increased most with Example 3, when the driven sprocket is the inside-flank engagement/outside-flank seating type while the driving sprocket is the outside-flank engagement/outside-flank seating type, Sprockets of different engagement/seating types can also be obtained by differing the numbers of teeth of the driving sprocket and driven sprocket.

Preferably, the sprocket with a fewer number of teeth should be the outside-flank seating type.

For example, when the fewer-teeth sprocket is the inside-flank engagement/inside-flank seating type while the larger (more teeth) sprocket is the inside-flank engagement/outside-flank seating type, as shown in S4 in FIG. 4, the noise level is reduced while the rotating fatigue strength is slightly decreased.

When the fewer-teeth sprocket is the inside-flank engagement/inside-flank seating type while the larger (more teeth) sprocket is the outside-flank engagement/outside-flank seating type, as shown in S5 in FIG. 4, similarly to S4, the noise level is reduced while the rotating fatigue strength is slightly decreased.

On the other hand, when the fewer-teeth sprocket is the inside-flank engagement/outside-flank seating type while the larger (more teeth) sprocket is the outside-flank engagement/outside-flank seating type, as shown in 4 in FIG, 4, the noise level is reduced while the rotating fatigue strength is kept sufficient for actual use.

When the fewer-teeth sprocket is the inside-flank engagement/outside-flank seating type while the larger (more teeth) sprocket is the inside-flank engagement/inside-flank seating type, as shown in 5 in FIG. 4, similarly to 4, the noise level is reduced while the rotating fatigue strength is kept sufficient for actual use.

When the fewer-teeth sprocket is the outside-flank engagement/outside-flank seating type while the larger (more teeth) sprocket is the inside-flank engagement/inside-flank seating type, as shown in 6 in FIG. 4, the rotating fatigue-strength is increased, and the noise level is reduced.

When the fewer-teeth sprocket is the outside-flank engagement/outside-flank seating type while the larger (more teeth) sprocket is the inside-flank engagement/outside-flank seating type, as shown in 7 in FIG. 4, similarly to 6, the rotating fatigue strength is increased, and the noise level is reduced.

In the embodiment where the driving sprocket and driven sprocket are given different numbers of teeth, the noise level is lowest with Example 5, when the fewer-teeth sprocket is the inside-flank engagement/outside-flank seating type while the larger (more teeth) sprocket is the inside-flank engagement/inside-flank seating type, while the rotating fatigue strength is increased most with Example 7, when the fewer-teeth sprocket is the outside-flank engagement/outside-flank seating type while the larger (more teeth) sprocket is the inside-flank engagement/outside-flank, seating type.

What is claimed is:

1. A chain drive mechanism comprising a driving sprocket, a driven sprocket, and a silent chain passed over said driving sprocket and said driven sprocket, wherein said silent chain and said driving sprocket have an engagement/seating mode that, is one of inside-flank engagement/inside-flank seating, inside-flank engagement/outside-flank seating, outside-flank engagement/inside-flank seating and outside-flank engagement/outside-flank seating, said silent chain and said driven sprocket have an engagement/seating mode that is one of inside-flank engagement/inside-flank seating, inside-flank engagement/outside-flank seating, outside-flank engagement/inside-flank seating, and outside-flank engagement/outside-flank seating, and the engagement/seating mode between said chain and said driving sprocket is different from the engagement/seating mode between said chain and said driven sprocket.

2. The chain drive mechanism according to claim 1, wherein teeth of one or both of said driving sprocket and said driven sprocket are formed with a pitch circle radius that is different from a standard pitch circle radius, and a dimensional difference between a pitch circle radius of said driving sprocket teeth and the standard pitch circle radius, and a dimensional difference between a pitch circle radius of said driven sprocket teeth and the standard pitch circle radius, are different from each other.

3. The chain drive mechanism according to claim 1, wherein said driving sprocket teeth and said driven sprocket teeth, which said silent chain engages with and seats on, have faces formed at different angles.

4. The chain drive mechanism according to claim 1, wherein said driving sprocket and said, driven sprocket have the same number of teeth, said silent chain has an inside-flank engagement mode when engaging with one of said driving sprocket and said driven sprocket, and said silent chain has an outside-flank seating mode when seating on the other of said, driving sprocket and said driven sprocket.

5. The chain drive mechanism according to claim 4, wherein said silent chain, has an outside-flank seating mode when seating on said driving sprocket and said driven sprocket.

6. The chain drive mechanism, according to claim 1, wherein one of said driving sprocket and said driven sprocket has a larger number of teeth than the other of the sprockets, and said silent chain has an outside-flank seating mode when seating on the other of said driving sprocket and said driven sprocket.

7. The chain drive mechanism according to claim 6, wherein said silent chain has an outside-flank engagement/outside-flank seating mode when engaging with and seating on the other of said driving sprocket and said driven sprocket.

* * * * *